July 9, 1929.  G. A. BURNHAM  1,720,509
PROTECTIVE DEVICE
Filed Dec. 14, 1921
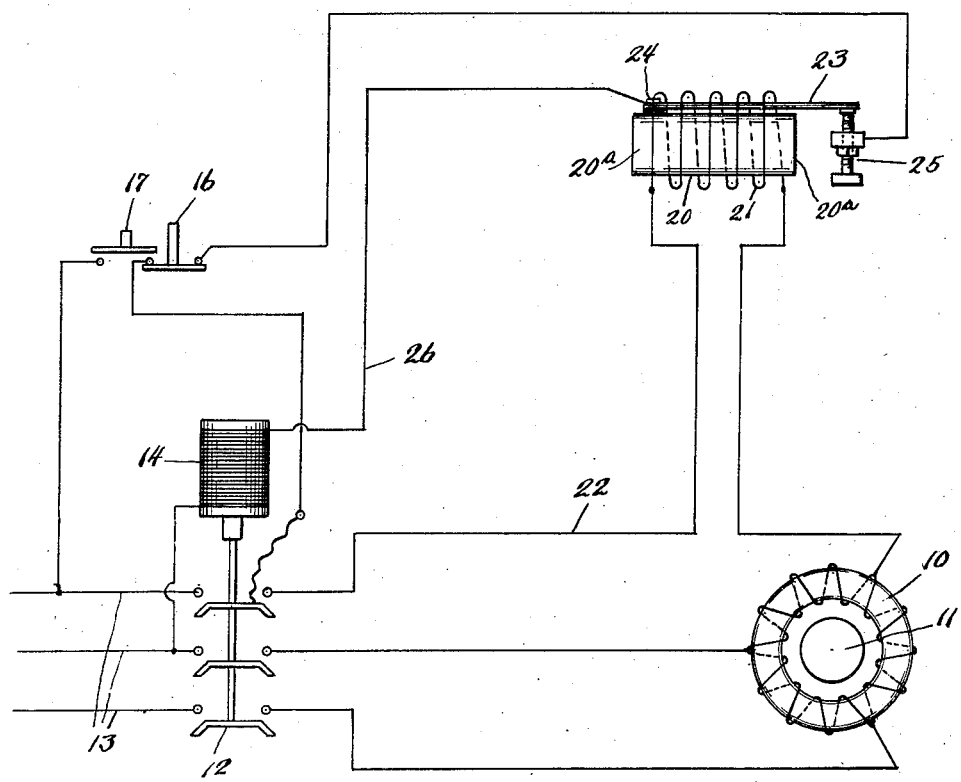

Patented July 9, 1929.

1,720,509

UNITED STATES PATENT OFFICE.

GEORGE A. BURNHAM, OF SAUGUS, MASSACHUSETTS, ASSIGNOR, BY MESNE ASSIGNMENTS, TO CONDIT ELECTRICAL MANUFACTURING CORPORATION, OF BOSTON, MASSACHUSETTS, A CORPORATION OF MASSACHUSETTS.

PROTECTIVE DEVICE.

Application filed December 14, 1921. Serial No. 522,241.

This invention relates to devices for protecting an electric apparatus against overloads, and has particular reference to devices adapted to protect an electric motor against overheating.

The primary purpose of providing an electric motor with protective devices operable upon overload conditions to isolate the motor from the line is to prevent damage to the component parts thereof of the motor, and particularly to the insulation of the current carrying components, due to overheating. There is usually some elevated degree of temperature of the motor components which can- not safely be exceeded although the motor may be operated without damage below such a degree of temperature.

The temperature rise of a motor is dependent upon many factors, one of which is the rate of dissipation of the heat generated. A motor will reach the critical temperature more rapidly when the surrounding atmosphere is hot than when it is cool, and when the surrounding atmosphere is dry than when it is humid.

The ordinary circuit-breaker provided with an overload trip coil having a retardation device associated with it will open the motor circuit at a predetermined time after the occurrence of an overload, regardless of variations in rate of temperature rise in the motor and usually will interrupt the motor circuit long before there is any danger of serious overheating of the motor components.

Thermostatic circuit-interrupting devices may have a time lag of operation which varies in accordance with variation in atmospheric conditions but, usually, the time lag of temperature rise in the thermostatic device is much shorter than in the motor and consequently the device will interrupt the motor circuit before it is actually desirable to do so.

It is highly desirable to maintain the motor connected with the line as long as possible in order to provide for continuity of service and to interrupt the motor circuit and stop the motor only when the motor temperature attains a critical elevated value.

Motor heating is dependent upon two main sources, heating in the magnetic components, or iron, due to hysteresis and eddy currents, and heating in the copper, or current-carrying components, due to resistance. The rates of heating in both sources may be and usually are different and the temperature rise of one component of the motor is not necessarily a measure of the temperature rise of another component of the motor.

An object of this invention is a protective device for electrical apparatus having means operable by the combined heating in the magnetic and current-carrying components to effect the interruption of the circuit including the electrical apparatus.

A further object is to provide a protective device having a time lag of operation which varies in accordance with variations in temperature rise of an electrical apparatus with which it is associated.

A further object is to provide a protective device with means to simulate the heating of the magnetic and current-carrying components of an electrical apparatus, as a motor, with which it is associated, and means operable upon a predetermined temperature rise to interrupt the circuit of the electrical apparatus.

The figure is a diagrammatic view illustrating a protective device embodying my invention applied to the protection of a three-phase induction motor.

As here shown, my invention is associated with the three-phase induction motor having the stator 10 and the rotor 11 and adapted to be connected to a line 13 through the switch 12 which is moved into closed position by energization of the closing coil 14 and retained in closed position by the continued energization of said coil, which also constitues a holding coil. The switch is controlled manually from the switch-opening button 16 and switch-closing button 17, both of which control the closing and holding coil 14.

The protective device embodying my invention comprises the magnetic core 20 having an alternating current energizing winding 21 thereon which is arranged in series with one of the circuit wires, as 22, of the motor. Said core 20 and winding 21 may comprise an electromagnet. A thermostatic element 23 may be disposed between the core 20 and winding 21 and may have one end rigidly supported as by being secured to but preferably insulated from the core 20, by the screw 24. Said thermostat element 23 may be of usual construction and comprise a bimetallic structure of metals having dissimilar heat-expansion coefficients, as for instance, superimposed strips of copper and zinc secured together in a suitable manner. The free end of said thermostatic element may extend outwardly beyond the end of said winding 21 and make and break electrical contact with the stationary contact member 25. Said thermostatic element 23 and contact member 25 are in series with the circuit 26 of the holding coil 14 which includes the switch-opening button 16 and the circuit connections may be such that the opening of the circuit 26 either at the thermostatic element or at the switch-opening button causes the de-energization of the holding coil and the opening of the switch 12; and said switch will remain open regardless of subsequent completion of the circuit 26 at the thermostat and switch-opening button.

The specific circuit arrangement herein shown is immaterial so far as the present invention is concerned and other relay means may be associated with my invention and the electrical apparatus to be protected, or the protective device may control the circuit directly.

The mass of magnetic material in the core 20 and the dimensions of the winding 21 are so proportioned with respect to the mass of the magnetic material and the conducting components of the electrical apparatus, as the motor 10, to be protected that the flux densities and hysteresis and eddy-current losses in the core, due to the alternating magnetic flux acting on said core by reason of the energizaation of said winding by alternating current, will be substantially equivalent to the corresponding factors in the motor; and the resistance loss in the winding is arranged to be approximately equivalent to the resistance loss in the conducting components of the motor. The heat dissipating surfaces of the protective device, as the exposed ends 20ª of the core 20 preferably bear a proportionate ratio to the effective heat dissipating surfaces of the motor. With this arrangement, the component parts of the protective device will have a temperature rise substantially equal in rate and value to that of the motor, and the thermostatic element 23 may be adjusted to operate to open the motor circuit when the temperature rise attains a predetermined value.

The relative proportions of the core 20 and winding 21 of the protective device will vary for apparatus having differing heating characteristics of their component parts and the structural features of the protective device may be varied without departing from the spirit of the invention.

I claim:

1. A thermal relay adapted for association with an electric circuit to protect energy-receiving apparatus therein against overload, said relay including a heating apparatus having an energizing coil, and a heat-generating element in inductive relation with said coil and adapted to have current induced therein, that portion of said heat-generating element which is in such inductive relation with said coil arranged to become heated by the induced current, and a thermo-responsive member arranged to be operatively influenced by the heat of said heat-generating element.

2. An electrical protective device comprising a thermal relay adapted for association with an electric circuit to protect energy-receiving apparatus therein against overload, said relay including a heating apparatus having a magnetic core, a winding thereon adapted to heat and also to generate heat in said core, when traversed by an alternating current, and thermal means arranged to be effectively influenced by the heat generated in both said core and said winding.

3. An electrical protective device comprising a thermal relay adapted for association with an electric circuit to protect energy-receiving apparatus therein against overload, said relay including a heating apparatus having a magnetic core, a winding thereon adapted to generate heat in itself and also in said core when traversed by an alternating current and thermal means arranged to be effectively influenced by the heat of said winding and also of said core.

4. An electrical protective device having a magnetic core, a winding disposed about and spaced from said core adapted to generate heat in itself and also in said core when traversed by an alternating current, and a thermal element disposed in the space between said core and winding arranged to be heated by both.

5. An electrical protective device having a magnetic core, a winding disposed on and spaced from said core, and a thermal element disposed in the space between said core and winding.

6. An electrical protective device having a magnetic core, a winding disposed on and spaced from said core and arranged to heat said core by the magnetic losses set up in said core, and a thermal element disposed in the space between said core and winding.

7. An electrical protective device having a magnetic core formed with an exposed heat-dissipating surface, a winding disposed about and spaced from said core and adapted to become heated, and also to generate heat in said core when traversed by an alternating current, and a thermal element disposed in the space between said core and winding and adapted to be actuated by the heat of both.

8. An electrical protective device including a heating member, means to produce an alternating magnetic flux in said member to cause it to become heated, and a bi-metallic thermo-responsive device disposed to receive heat radiated from said heating member and to be effectively operated thereby.

9. An electrical protective device including a fixed heat-generating member, means to produce an alternating magnetic flux to act on said member and cause it to become heated, and a movable thermo-responsive device arranged in heat-receiving relation with said fixed heating member to be effectively operated by the heat thereof.

10. A protective device for apparatus in an electric circuit having an energizing coil adapted to be heated and an iron core in the field of the coil also adapted to be heated, said protective device including a thermo-responsive element adapted to be heated and operate to open the circuit including the apparatus to be protected, and a heating apparatus for said thermo-responsive element having an energizing coil adapted to be energized from the circuit of the apparatus and an iron core in the field of said coil and both adapted to have heat generated therein as in the coil and core of the apparatus and both said coil and core arranged in effective heat-imparting relation with said thermo-responsive element.

In testimony whereof, I have signed my name to this specification.

GEORGE A. BURNHAM.